(12) United States Patent
Abe

(10) Patent No.: US 7,133,176 B2
(45) Date of Patent: Nov. 7, 2006

(54) LASER SCANNING APPARATUS

(75) Inventor: Masaaki Abe, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 10/651,214

(22) Filed: Aug. 29, 2003

(65) Prior Publication Data

US 2004/0057092 A1    Mar. 25, 2004

(30) Foreign Application Priority Data

Sep. 25, 2002    (JP) .............................. 2002-279223

(51) Int. Cl.
*G02B 26/08*    (2006.01)
(52) U.S. Cl. .................................... 359/204
(58) Field of Classification Search ................ 359/198, 359/204–208, 216
See application file for complete search history.

(56) References Cited

U.S. PATENT DOCUMENTS 5,805,199 A * 9/1998 Aoki .......................... 347/256

6,509,995 B1 * 1/2003 Suzuki et al. ............... 359/196

FOREIGN PATENT DOCUMENTS

JP          1-250922          5/1989

* cited by examiner

*Primary Examiner*—Euncha P. Cherry
(74) *Attorney, Agent, or Firm*—Staas & Halsey LLP

(57) ABSTRACT

A laser scanning apparatus scanning a bundle of light rays emitted from a light source of a monolithic multi-beam semiconductor laser in a main scanning direction by being reflected by a polygon mirror includes a first lens to focus the bundle of light rays emitted from the light source and a second lens guiding the bundle of light rays transmitted by the first lens toward a deflection surface of the polygon mirror. In the laser scanning apparatus, the multi-beam semiconductor laser is installed with an imaginary line drawn through light emitting points of the laser inclined with respect to the main scanning direction, the first lens is a convex lens having an anamorphic surface shape on at least one surface focusing the bundle of light rays in front of a slit only in the main scanning direction, and the second lens is a cylindrical lens making the bundle of light rays a bundle of parallel light rays or a bundle of concentrated light rays in the main scanning direction.

31 Claims, 4 Drawing Sheets

LASER SCANNING APPARATUS

CROSS-REFERENCE TO RELATED APPLICATIONS

This application claims the benefit of Japanese Application No. 2002-279223, filed on Sep. 25, 2002, in the Japanese Intellectual Property Office, the disclosure of which is incorporated herein by reference.

BACKGROUND OF THE INVENTION

1. Field of the Invention

The present invention relates to a laser scanning apparatus used for a digital copier or a laser printer.

2. Description of the Related Art

In a typical laser scanning apparatus used for a digital copier or a laser printer, a bundle of divergent light rays emitted from a semiconductor laser light source is converted by a collimating lens to a bundle of parallel light rays, or a bundle of concentrated light rays. Then, the bundle of light rays is scanned by being reflected by a polygon mirror, and passes through a plurality of optical lenses and mirrors so that an image is formed on a photosensitive body.

Recently, a recording method using a multi-beam laser has been used to promote a high speed of a laser beam printer. For this method, a semiconductor laser (hereinafter, referred to as "LD"), in which a plurality of light emitting points are monolithically formed, is used as the light source. The monolithic multi-beam LD generally has a wide interval between the light emitting points.

In particular, Japanese Patent No. 2554724 (Publication No. 01-250922) discloses that it is difficult to manufacture a visible ray type monolithic multi-beam LD having an interval between light emitting points of less than 70–100 μm.

When a monolithic multi-beam LD having a wide interval between light emitting points is used, many problems are generated, according to the installation method thereof.

FIG. 1 is a view showing an imaginary line drawn through the light emitting points of a semiconductor laser that is perpendicular to a main scanning direction. Referring to FIG. 1, when the semiconductor laser is used such that the imaginary line thereof is perpendicular to a main scanning direction, that is, a direction in which a light beam is scanned by being reflected by a polygon mirror, distortion of an image surface is generated in a scanning lens having a great power in a sub-scanning direction, which is perpendicular to the main scanning direction, so that a high level of optical performance cannot be obtained.

In the optical scanning apparatus, to correct inclination of a polygon mirror surface, the light emitting point of the LD and the polygon mirror surface are formed optically to be a conjugate function in the sub-scanning direction, which is perpendicular to the main scanning direction. Since the light emitted from the light emitting point of the LD is enlarged by 2–10 times on a surface of the polygon mirror, a beam interval on the surface of the polygon mirror is made greater than that on a surface of the LD.

Since the respective light emitting points spaced as above form images on the photosensitive body via a scanning lens, when a scanning lens having a great power in the sub-scanning direction is used, aberration such as image curvature is easily generated.

Also, when a scanning lens having less power in the sub-scanning direction is used, generation of the aberration can be restricted, but a focal length increases so that the size of an optical system increases. Although the same aberration reduction effect can be obtained by decreasing a magnifying power of conjugate between the LD and the polygon mirror, since the efficiency of use of light is lowered, it is not appropriate for a high speed scanning.

Next, FIG. 2 is a view showing a case in which the semiconductor laser is installed with the imaginary line drawn through the light emitting points inclined with respect to the main scanning direction. Referring to FIG. 2, when the LD is installed with the imaginary line inclined with respect to the main scanning direction, since an angle at which a light beam of the LD spreads is greater in a direction perpendicular to the main scanning direction than a direction parallel to the main scanning direction, the beam is vertically lengthy after passing through the collimating lens.

In general, a slit having an opening that is horizontally lengthy is arranged after the collimating lens in the optical scanning apparatus to correct the shape of a beam utilizing a diffraction effect thereof. Thus, the light beam incident on the slit needs to have a sufficiently great strength at the opening of the slit.

However, when the incident beam is vertically lengthy, a sufficiently great strength cannot be obtained at the opening of the slit unless the focal length is increased and the shape of the light beam is magnified. Thus, much of the laser power of the light beam is lost when the light beam passes the slit. Also, when an optical device is provided after the collimating lens to correct the shape of the light beam, the number of parts increases, raising the cost accordingly.

SUMMARY OF THE INVENTION

To solve the above and/or other problems, the present invention provides a laser scanning apparatus which can prevent reduction of a slit transmittance, as well as the increase of the number of parts, although a monolithic multi-beam semiconductor laser is used as a light source.

Additional aspects and advantages of the invention will be set forth in part in the description which follows and, in part, will be obvious from the description, or may be learned by practice of the invention.

According to an aspect of the present invention, a laser scanning apparatus scanning a bundle of light rays emitted from a light source of a monolithic multi-beam semiconductor laser in a main scanning direction by being reflected by a polygon mirror, the apparatus comprising a first lens to focus the bundle of light rays emitted from the light source and a second lens guiding the bundle of light rays transmitted by the first lens toward a deflection surface of the polygon mirror, wherein the multi-beam semiconductor laser is installed with an imaginary line drawn through the light emitting points inclined with respect to the main scanning direction, the first lens is a convex lens having an anamorphic surface shape on at least one surface focusing the bundle of light rays in front of a slit only in the main scanning direction, and the second lens is a cylindrical lens making the bundle of light rays a bundle of parallel light rays or a bundle of concentrated light rays in the main scanning direction.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
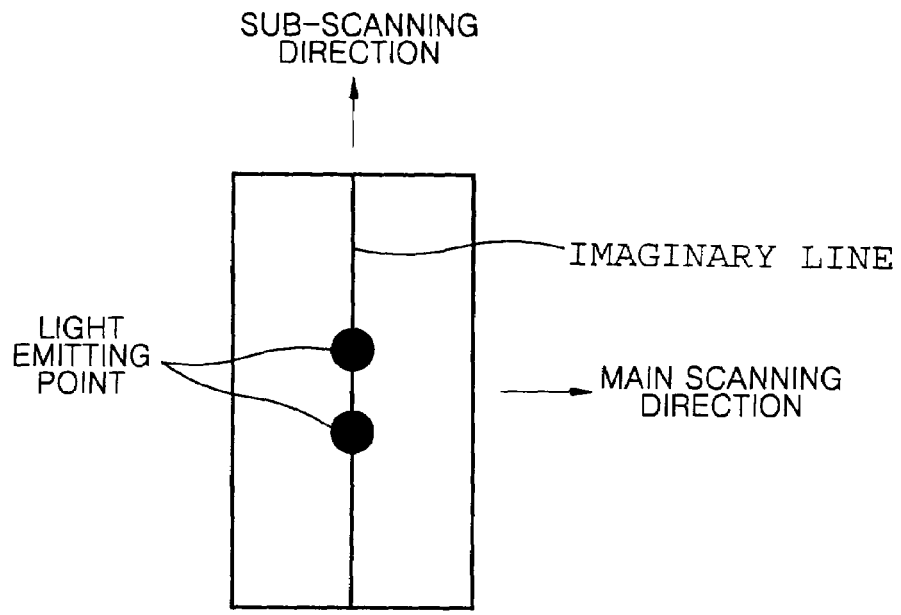
FIG. 1 is a view illustrating an imaginary line drawn through the light emitting points of a semiconductor laser which is perpendicular to a main scanning direction.
Figure 2:
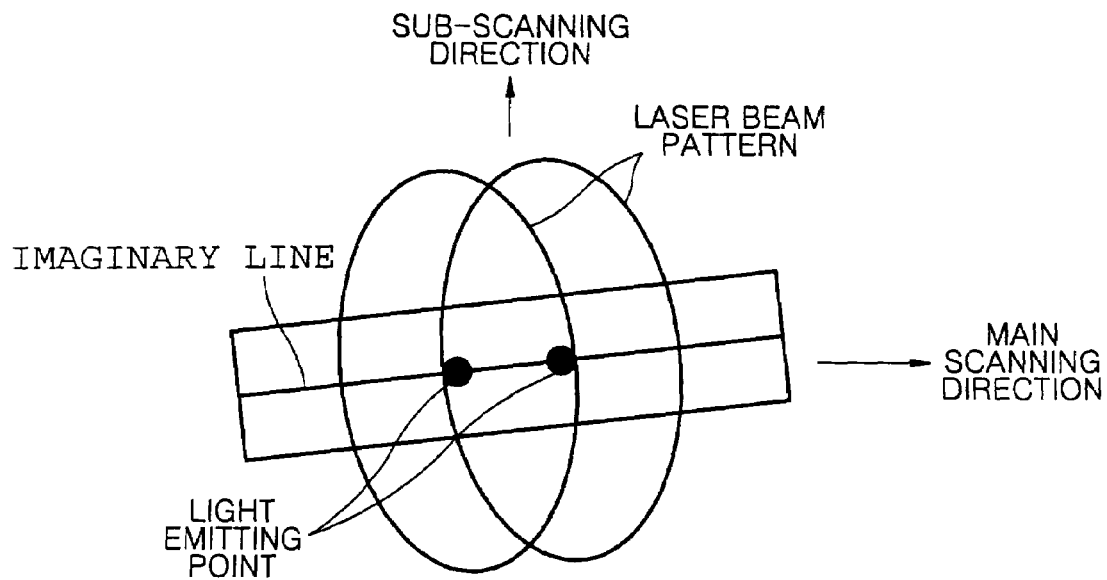
FIG. 2 is a view illustrating a case in which the semiconductor laser is installed with the imaginary line drawn through the light emitting points inclined with respect to the main scanning direction.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
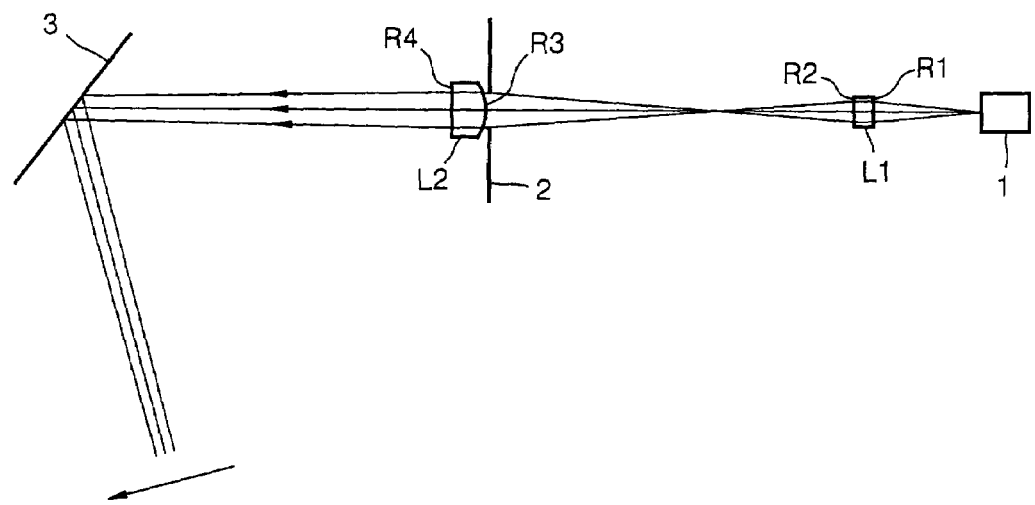
FIG. 3 is a view illustrating the optical path and structure of a laser scanning apparatus according to an embodiment of the present invention at a main scanning surface that is a plane including a main scanning direction.

Referring to FIGS. 3 through 6, in a laser scanning apparatus used for a laser printer, a bundle of light rays emitted from a light source 1 of a monolithic multi-beam LD, in a main scanning direction as indicated by an arrow of FIG. 3, is reflected by a polygon mirror 3 to be scanned. The scanned light beam is incident on a photosensitive body (not shown) through an f-theta lens (not shown).

The laser scanning apparatus includes a first lens L1 to concentrate the bundle of light rays emitted from the light source 1, a slit 2 to correct the shape of the bundle of light rays transmitted from the first lens L1, and a second lens L2 making the bundle of light rays transmitted from the first lens L1 parallel, and radiating the parallel light toward a deflection surface of the polygon mirror 3.

The slit 2 is installed on an incident surface of the second lens L2, and has an opening which has an oval shape 3.2 mm long in the main scanning direction, and 1.1 mm long in a sub-scanning direction.

The light source 1 is a monolithic 2-beam semiconductor laser installed such that an imaginary line drawn through the light emitting points is slightly inclined, that is, at an intersection angle that is an acute angle, close to the horizon, from a horizontal state with respect to the main scanning direction, that is, on a plane including the main scanning direction. A spread angle that is a full angle at half maximum is 10° in the main scanning direction and 30° in the sub-scanning direction, while the interval between the light emitting points is 100 μm, and an oscillation wavelength is 650 nm.

Figure 4:
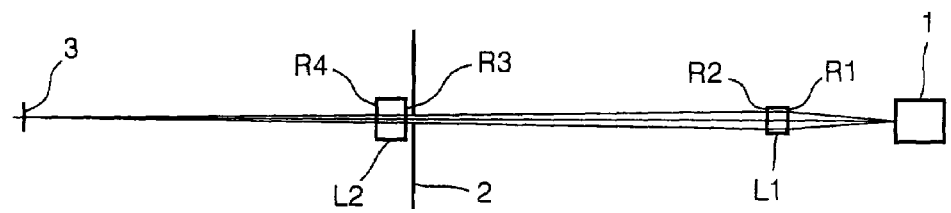
FIG. 4 is a view illustrating the optical path and structure of a laser scanning apparatus according to an embodiment of the present invention at a sub-scanning surface that is a plane including a sub-scanning direction.

The first lens L1 is a convex lens having an anamorphic shape formed on at least one surface thereof so that the bundle of light rays is focused in front of the slit 2 only in the main scanning direction. The first lens L1 also has a surface shape to focus the bundle of light rays on the deflection surface of the polygon mirror 3, by means of the second lens L2, in the sub-scanning direction, that is, on a plane including the sub-scanning direction, as shown in FIG. 4. The first lens L1 is preferably made of glass, considering the change in performance according to a change in the environment.

Figure 5:
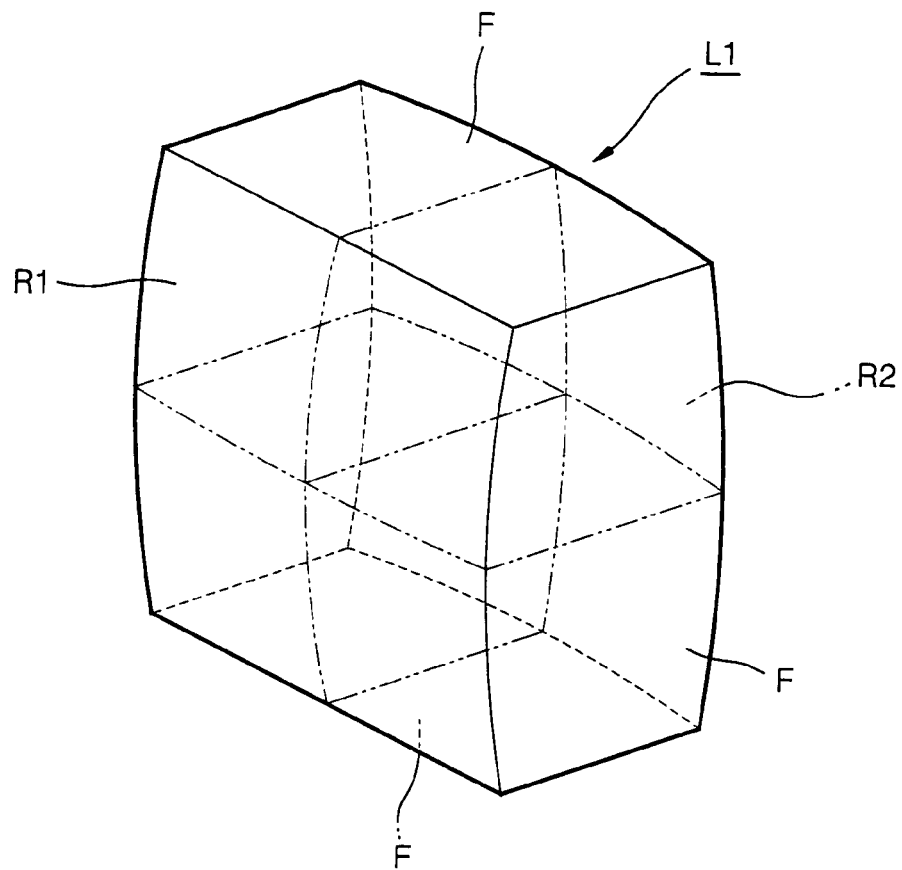
FIG. 5 is a perspective view illustrating the shape of a first lens of the laser scanning apparatus according to an embodiment of the present invention.

Also, the first lens L1 has an anamorphic surface shape only at a surface facing the slit 2 and a flat surface F to determine a position for installation of the first lens L1, as shown in FIG. 5.

The second lens L2, as shown in FIG. 3, is a cylindrical lens made of plastic which makes the bundle of light rays in the main scanning direction into a bundle of parallel light rays. Also, a curved surface of the second lens L2 is an aspherical surface.

An example of optical characteristic data in the first lens L1 and the second lens L2 is shown in Table 1.

| Radius of Curvature in Main Scanning Direction (mm) | Radius of Curvature in Sub-Scanning Direction (mm) | Aspherical Aberration | Distance d (mm) | Refractive Ratio λ (650 mm) | Remark |
|---|---|---|---|---|---|
| R1 = 9.28* | | K = 0 | d1 = 11.16<br>d2 = 2.5 | 1<br>1.75 | Axially Symmetrical Aspherical Surface |
| | | A = 0.594744 × 10⁻³<br>B = 0<br>C = 0<br>D = 0 | | | |
| R2 = 7.69 | R2 = 35.64 | | D3 = 40 | 1 | Anamorphic Surface |
| R3 = 13.6* | R3 = ∞ | K = 0 | D4 = 3 | 1.53 | Aspherical Cylindrical |

-continued

| Radius of Curvature in Main Scanning Direction (mm) | Radius of Curvature in Sub-Scanning Direction (mm) | Aspherical Aberration | Distance d (mm) | Refractive Ratio λ (650 mm) | Remark |
|---|---|---|---|---|---|
|  |  | A = 0.594744 × 10⁻³ B = 0 C = 0 D = 0 |  |  | Surface |
| R4 = ∞ |  |  | D5 = 40 | 1 | Flat surface |

Note:
*indicates an aspherical surface.

Here, as shown in FIGS. 3 and 4, the surface R1 of the first lens L1 is a surface that is an axially symmetrical aspherical surface at the side of the light source 1, the surface R2 of the first lens L1 is a surface that is an anamorphic surface at the side of the slit 2, the surface R3 of the second lens L2 is a surface that is an aspherical surface at the side of the slit 2, and the surface R4 of the second lens L2 is a surface that is a flat surface at the side of the polygon mirror 3.

The distance d1 is an interval between the LD and the first lens L1 the distance d2 is a thickness of the center of the first lens L1, the distance d3 is an interval between the first lens L1 and the second lens L2, the distance d4 is a thickness of the center of the second lens L2, and the distance d5 is an interval between the second lens L2 and the polygon mirror 3.

Figure 6:
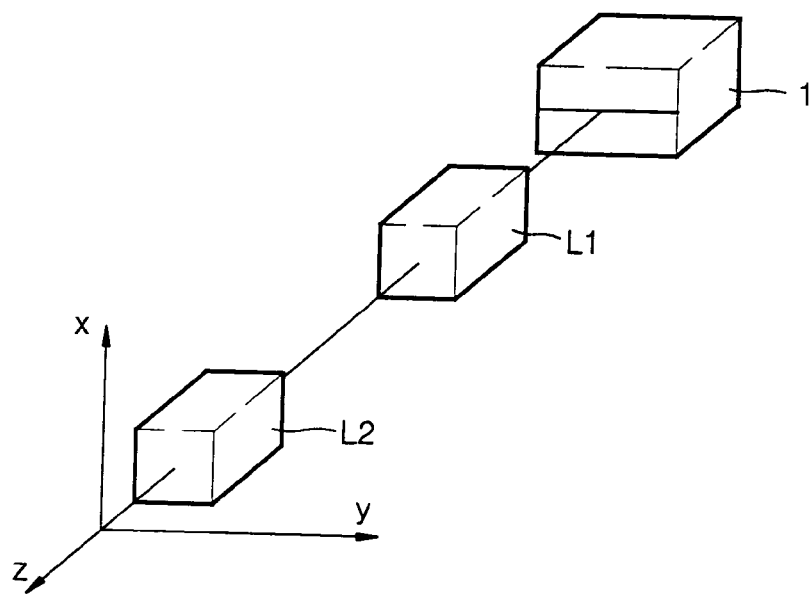
FIG. 6 is a view illustrating the coordinate system of an aspherical surface formula according to an embodiment of the present invention.

Also, the aspherical surface of the surface R3 is defined by Equation 1 and set as an optimal curved surface to correct aberration. A coefficient of a coordinate is shown in FIG. 6.

$$Z = \frac{cr^2}{1 + \sqrt{1 - (1+k)c^2 r^2}} + Ar^2 + Br^2 + Cr^2 + Dr^2$$

$$z^2 = x^2 + y2$$

Here, "c" is a radius of curvature of an apex of a surface.

In one embodiment of the present invention, since the first lens L1 is a convex lens having an anamorphic shape formed on at least one surface thereof so that the bundle of light rays is focused in front of the slit 2 only in the main scanning direction, the focus is formed just in front of the slit 2 by the first lens L1, so that the beam incident on the slit 2 is in a spread state only in the main scanning direction.

Thus, even when the imaginary line drawn through the light emitting points is nearly horizontal, lowering of a slit transmittance can be prevented without increasing the number of parts.

Figure 7:
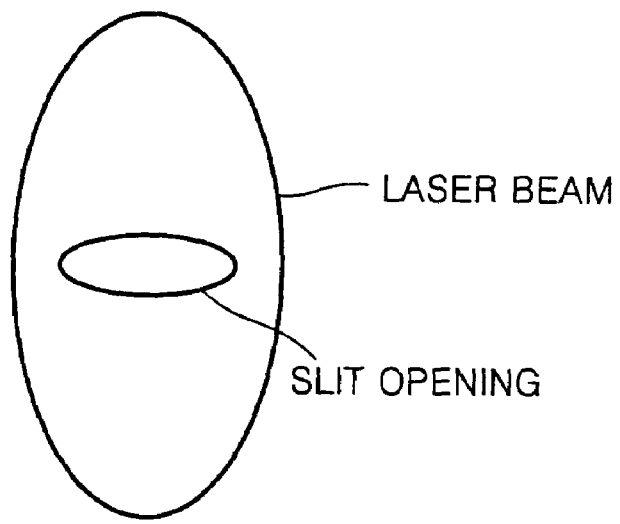
FIG. 7 is a view showing the relationship between the diameter of a light beam and the shape of an opening of a slit according to the conventional technology when the light beam is incident on the slit.
Figure 8:
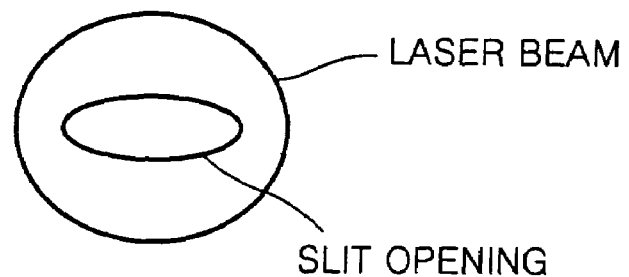
FIG. 8 is a view showing the relationship between the diameter of a light beam and the shape of an opening of a slit according to an embodiment of the present invention when the light beam is incident on the slit.

FIG. 7 is a view showing the relationship between the diameter of a light beam and the shape of an opening of a slit according to the conventional technology when the light beam is incident on the slit. FIG. 8 is a view showing the relationship between the diameter of a light beam and the shape of an opening of a slit according to an embodiment of the present invention when the light beam is incident on the slit.

Referring to FIGS. 7 and 8, in the above laser scanning apparatus, since the beam is focused by the first lens L1 in front of the slit 2 in the main scanning direction and then magnified, the shape of the beam incident on the slit 2 is enlarged. Next, since the beam is focused in the sub-scanning direction, the shape of the beam incident on the slit 2 is contracted.

Thus, the diameter of the beam incident on the slit 2 becomes close to a horizontally lengthy shape like the shape of the opening of the slit 2, compared with a case using a conventional collimating lens, so that loss of laser power during passing through the slit 2 decreased. Also, the slit 2 can be provided at any position in front of or at the rear of the second lens L2.

A detailed transmittance is listed in Table 2.

|  | Slit Transmittance (%) | Remark |
|---|---|---|
| Using a conventional collimating lens | 3 | Focal length of collimating lens is 30 mm |
| Using a collimating lens of the present invention | 13 |  |

Since the second lens L2 is a cylindrical lens which converts the bundle of light rays to a bundle of parallel light rays, or a bundle of concentrated light rays, in the main scanning direction, the beam enlarged in the main scanning direction, converted by the cylindrical lens and having power only in the main scanning direction, into a bundle of parallel light rays, or a bundle of concentrated light rays, can be incident on the f-theta lens.

Also, since the first lens L1 has a surface having a shape by which the bundle of light rays is focused on the deflection surface of the polygon mirror 3 by the second lens L2 in the sub-scanning direction, the inclination of the polygon mirror 3 can be corrected by forming the deflection surface of the polygon mirror 3 and the photosensitive body to be a conjugate function. Also, since the first lens L1 has a function of focusing the bundle of light rays in the sub-scanning direction on the deflection surface of the polygon mirror 3, the second lens L2 does not need to be of complex manufacture, and the cost for manufacturing parts can be reduced.

Since the first lens L1 has a flat surface portion F for determination of a position, the determination of a position of the first lens L1, having an anamorphic surface shape, can be accurately and easily performed. Also, deterioration of an optical characteristic due to a positional deviation generated during installation of the first lens L1 can be prevented.

Since the curved surface of the second lens L2 is an aspherical surface, even when the first lens L1 is exhibiting a relatively low effect of correction of aberration due to the anamorphic surface shape thereof, aberration can be corrected by the second lens L2.

While this invention has been particularly shown and described with reference to preferred embodiments thereof, it will be understood by those skilled in the art that various changes in form and details may be made therein without departing from the spirit and scope of the invention as defined by the appended claims. For example, although the anamorphic surface of the first lens L1 is provided to face one side of the slit 2 in the above embodiment, the anamorphic surface can be provided at the opposite side, or at both sides thereof.

As described above, in the laser scanning apparatus according to an embodiment of the present invention, the first lens is a convex lens having an anamorphic surface shape at one surface so that the bundle of light rays are focused in front of the slit only in the main scanning direction, and the second lens is a cylindrical lens converting the bundle of light rays to a bundle of parallel light rays, or a bundle of concentrated light rays, in the main scanning direction. Thus, even when a monolithic multi-beam semiconductor laser is installed with the imaginary line drawn through the light emitting points inclined with respect to the main scanning direction, the shape of a beam incident on the slit is in a spread state, so that lowering of a slit transmittance can be prevented. Simultaneously, the beam made into the bundle of parallel light rays, or concentrated light rays, in the main scanning direction can be incident on the f-theta lens. As a result, a high speed laser scanning apparatus with less loss of laser power can be realized.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A laser scanning apparatus scanning a bundle of light rays emitted from a light source of a monolithic multi-beam semiconductor laser in a main scanning direction by being reflected by a polygon mirror, the apparatus comprising:
    a first lens to focus the bundle of light rays emitted from the light source and a second lens guiding the bundle of light rays transmitted by the first lens toward a deflection surface of the polygon mirror,
    wherein the multi-beam semiconductor laser is installed such that an imaginary line drawn through light emitting points of the laser is inclined with respect to the main scanning direction, the first lens is a convex lens having an anamorphic surface shape on at least one surface focusing the bundle of light rays in front of a slit only in the main scanning direction, and the second lens is a cylindrical lens making the bundle of light rays a bundle of parallel light rays or a bundle of concentrated light rays in the main scanning direction.

2. The laser scanning apparatus of claim 1, wherein the first lens has a surface shape to focus the bundle of light rays on the deflection surface of the polygon mirror through the second lens in a sub-scanning direction which is perpendicular to the main scanning direction.

3. The laser scanning apparatus of claim 2, wherein the first lens has a flat surface portion on which the first lens is installed.

4. The laser scanning apparatus of claim 2, wherein the first lens is made of glass.

5. The laser scanning apparatus of claim 2, wherein the first lens has an anamorphic surface shape at one or more of surfaces facing the slit and facing away from the slit.

6. The laser scanning apparatus of claim 3, wherein the second lens has a curved surface which is an aspherical surface.

7. The laser scanning apparatus of claim 6, wherein the second lens corrects aberration of the bundle of light rays not corrected by the first lens.

8. The laser scanning apparatus of claim 2, further comprising:
    a photosensitive body;
    wherein an inclination of the polygon mirror is corrected by forming a deflection surface of the polygon mirror and the photosensitive body to be a conjugate function.

9. The laser scanning apparatus of claim 1, wherein the first lens has a flat surface portion on which the first lens is installed.

10. The laser scanning apparatus of claim 9, wherein the second lens has a curved surface which is an aspherical surface.

11. The laser scanning apparatus of claim 2, wherein the second lens has a curved surface which is an aspherical surface.

12. The laser scanning apparatus of claim 2, wherein the bundle of light rays is focused by the first lens in front of the slit in the main scanning direction and then magnified, enlarging a shape of the bundle of light rays incident on the slit.

13. The laser scanning apparatus of claim 12, wherein the bundle of light rays is focused in the sub-scanning direction by the first lens, contracting the shape of the bundle of light rays incident on the slit.

14. The laser scanning apparatus of claim 13, wherein a diameter of the bundle of light rays incident on the slit is horizontally lengthy.

15. The laser scanning apparatus of claim 1, wherein the second lens has a curved surface which is an aspherical surface.

16. The laser scanning apparatus of claim 15, wherein the second lens is made of plastic.

17. The laser scanning apparatus of claim 1, wherein the slit is installed on an incident surface of the second lens.

18. The laser scanning apparatus of claim 1, wherein the slit is oval shaped, 3.2 mm long in the main scanning direction and 1.1 mm long in a sub-scanning direction which is perpendicular to the main scanning direction.

19. The laser scanning apparatus of claim 1, wherein the monolithic multi-beam semiconductor laser is inclined at an acute angle from a horizontal state with respect to the main scanning direction.

20. The laser scanning apparatus of claim 1, wherein an interval between light emitting points of the monolithic multi-beam semiconductor laser is 11 μm.

21. The laser scanning apparatus of claim 1, wherein the slit is installed at any position in front of or behind the second lens.

22. The laser scanning apparatus of claim 1, wherein a surface of the first lens facing away from the slit is an axially symmetrical aspherical surface.

23. The laser scanning apparatus of claim 1, wherein a surface of the second lens facing the first lens is an aspherical cylindrical surface.

24. The laser scanning apparatus of claim 1, wherein a surface of the second lens facing away from the first lens is a flat surface.

25. The laser scanning apparatus of claim 1, wherein the shape of the bundle of light rays on the slit is in a spread state that prevents lowering of a slit transmittance.

26. The laser scanning apparatus of claim 25, further comprising:
an f-theta lens;
wherein the bundle of parallel light rays in the main scanning direction is incident on the f-theta lens.

27. A method of scanning a bundle of light rays emitted from a monolithic multi-beam semiconductor laser in a main scanning direction by reflecting the rays in a polygon mirror, the method comprising:
installing the multi-beam semiconductor laser inclined with respect to the main scanning direction;
focusing the bundle of light rays in front of a slit only in the main scanning direction with a convex lens having an anamorphic surface shape on at least one surface; and
making the bundle of light rays a bundle of parallel light rays, or a bundle of concentrated light rays, in the main scanning direction with a cylindrical lens.

28. A laser printer comprising:
a polygon mirror;
a monolithic multi-beam semiconductor laser emitting a bundle of light rays in a main scanning direction and being scanned by being reflected by the polygon mirror; and
a first lens to focus the bundle of light rays emitted from the multi-beam semiconductor laser and a second lens guiding the bundle of light rays transmitted by the first lens toward a deflection surface of the polygon mirror,
wherein the multi-beam semiconductor laser is installed with an imaginary line drawn through light emitting points of the laser inclined with respect to the main scanning direction, the first lens is a convex lens having an anamorphic surface shape on at least one surface focusing the bundle of light rays in front of a slit only in the main scanning direction, and the second lens is a cylindrical lens making the bundle of light rays a bundle of parallel light rays or a bundle of concentrated light rays in the main scanning direction.

29. A digital copier comprising:
a polygon mirror;
a monolithic multi-beam semiconductor laser emitting a bundle of light rays in a main scanning direction and being scanned by being reflected by the polygon mirror; and
a first lens to focus the bundle of light rays emitted from the multi-beam semiconductor laser and a second lens guiding the bundle of light rays transmitted by the first lens toward a deflection surface of the polygon mirror,
wherein the multi-beam semiconductor laser is installed with an imaginary line drawn through light emitting points of the laser inclined with respect to the main scanning direction, the first lens is a convex lens having an anamorphic surface shape on at least one surface focusing the bundle of light rays in front of a slit only in the main scanning direction, and the second lens is a cylindrical lens making the bundle of light rays a bundle of parallel light rays or a bundle of concentrated light rays in the main scanning direction.

30. A laser scanning apparatus comprising:
a polygon mirror;
a monolithic multi-beam semiconductor laser emitting a bundle of light rays in a main scanning direction, the light rays being scanned by being reflected by the polygon mirror, wherein the multi-beam semiconductor laser is inclined with respect to the main scanning direction; and
a convex lens having an anamorphic shape formed on at least one surface thereof, focusing the bundle of light rays in front of a slit only in the main scanning direction;
wherein the beam incident on the slit is in a spread state only in the main scanning direction.

31. A laser scanning apparatus comprising:
a multi-beam semiconductor laser;
wherein the multi-beam semiconductor laser is provided such that an imaginary line passing through light emitting points of the laser is inclined with respect to a main scanning direction.

* * * * *